W. H. BURRITT.
PNEUMATIC TIRE.
APPLICATION FILED AUG. 26, 1911.
1,031,685.
Patented July 9, 1912.
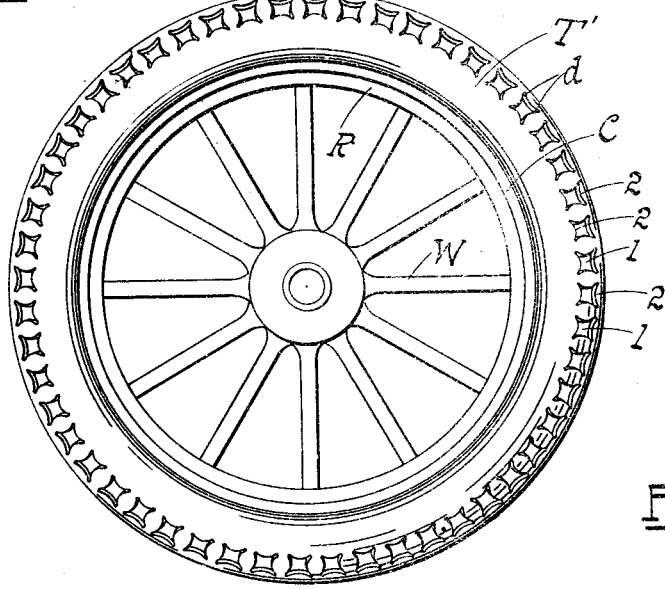
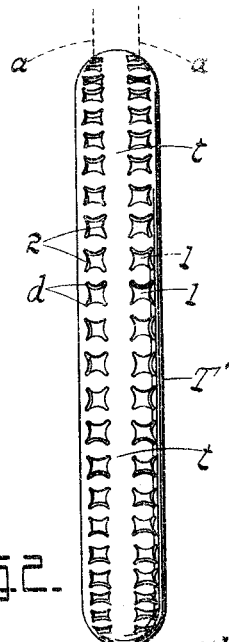
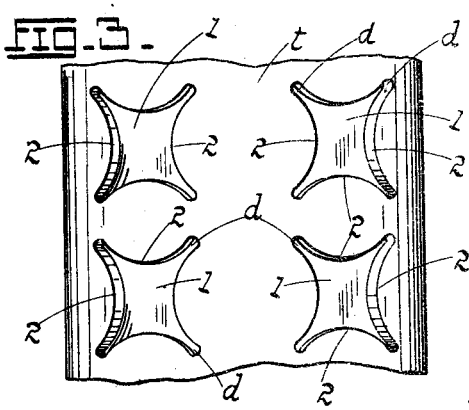
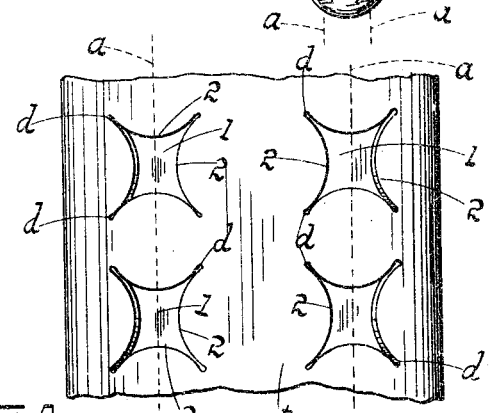
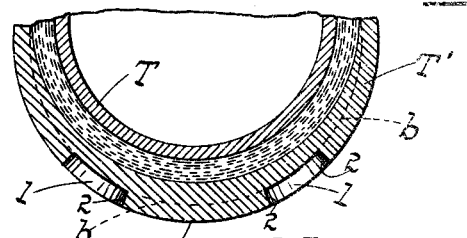
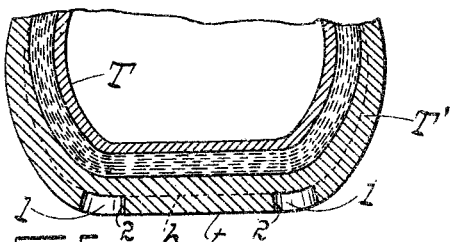
WITNESSES:
Harry A. Bennett
Jos. A. Michel
INVENTOR.
Wm. H. Burritt
BY
ATTORNEY.

UNITED STATES PATENT OFFICE.

WILLIAM H. BURRITT, OF ST. LOUIS, MISSOURI.

PNEUMATIC TIRE.

1,031,685.  Specification of Letters Patent.  Patented July 9, 1912.

Application filed August 26, 1911. Serial No. 646,197.

*To all whom it may concern:*

Be it known that I, WILLIAM H. BURRITT, citizen of the United States, residing at St. Louis, State of Missouri, have invented certain new and useful Improvements in Pneumatic Tires, of which the following is a full, clear, and exact description, reference being had to the accompanying drawings, forming a part hereof.

My invention has relation to improvements in pneumatic tires; and it consists in the novel details of construction more fully set forth in the specification and pointed out in the claims.

In the drawings, Figure 1 is a side elevation of a wheel showing my invention applied thereto; Fig. 2 is an edge view thereof; Fig. 3 is an enlarged edge view of a section of the outer casing before the same is subjected to material compression; Fig. 4 is a similar view showing the casing compressed under a load; Fig. 5 is a transverse section of the tire taken across the pockets before the tire is compressed under a load; and Fig. 6 is a similar section taken while the tire is under compression.

The object of my invention is to construct a pneumatic tire in which the outer casing shall be so formed as to readily respond to the load of the vehicle and its contents without subjecting the tread to the destructive compression along lines at which the tire must eventually weaken or crack.

A further object is to provide a casing in which the outer layers of rubber shall be free to play over the inner layers under the variable loads which the vehicle may carry.

The advantages of the invention will more fully appear from a detailed description thereof, which is as follows:—Referring to the drawings, W, represents a conventional automobile wheel, T the inner inflatable tube of the tire, and T′ the outer casing held to the rim R thereof by the clencher ring C as usual in the art and well understood. Under considerable load the tire is subjected to more or less compression (Fig. 6), the rubber being driven laterally in each direction from the center of the wheel, the material being crowded to points disposed on the periphery of the tire along the dotted lines $a, a$, lying in planes parallel to the plane of rotation of the wheel. This crowding of the material at these lines $(a, a)$ causes the rubber to crack or disintegrate, such disintegration sometimes taking place very rapidly and thus destroying the life of the outer casing. To avoid the crowding, compression or congestion of the rubber at these points is the object of my invention and this I accomplish as follows:—Disposed along the periphery of the casing T′ on each side of the center thereof, and along lines lying in planes parallel to the plane of rotation of the wheel are series of pockets or depressions 1, 1, (preferably in transverse alinement, as shown) the sides or bounding walls 2, 2, of the depressions being convexed inwardly or toward the center of the depression. The bottoms of the several pockets are disposed along a surface whose transverse curvature is defined substantially by the dotted line $b$ (Figs. 5, 6). The disposition of the depressions as described leaves a central circular section or tread $t$ on which the wheel in the main, runs, the depressions being thus disposed on opposite sides of said tread $t$. When no material load rests on the wheels, the sides 2 of the pockets or depressions are at their greatest distance apart (Figs. 3, 5); but when a heavy load bears upon the wheel the tread becoming compressed drives the sides of the pockets toward each other (Figs. 4, 6) partially closing the pockets or reducing their areas. This action results from the fact that the outer layers of rubber, or those lying outside the line $b$ have a more or less free play over the inner layers or those lying inside the line $b$, this free play being accorded them by reason of the yielding character of the convex sides of the pockets 1. In other words the convexity of the sides 2 is on the side or in the direction toward which the pressure on the outer layers is exerted as a result of the load, the sides being free to stretch or be drawn toward the center of the pocket without crowding or congestion, the removal of the material at these points (the pockets) allowing these outer layers perfect freedom of movement or play over the inner layers without materially disturbing such inner layers or affecting their integrity.

When the tire is subjected to compression, a draft is exerted on the outer layers of rubber, such draft being most pronounced in the region of the surface of contact of the tread with the ground on which the wheel is running. This draft pulls the sides of the tire toward the lines $a, a$, the direct pressure on the tread on the other hand forcing the outer layers toward these same lines, the result being that the rubber is crowded toward the centers of the pockets; and since the absence of material from the pockets permits the convex yielding sides 2, 2, thereof to freely approach and recede from the lines a, a, it follows that there will be practically no congestion or crowding of the rubber along those lines, and the life of the casing will be materially prolonged.

It will be seen that the pockets 1 have four convex sides or walls, but it would fall within the spirit of my invention were the pocket provided with only two convex sides though the advantages from two would not be as pronounced as from four (or more). The sides which are perhaps called into requisition to the greatest extent are the two opposing sides which lie parallel to the plane of the wheel's rotation, the transverse sides being more or less secondary though nevertheless desirable or essential. The corner recesses d between the meeting ends of the several sides 2 allow the latter a maximum degree of play for the purposes specified.

Having described my invention, what I claim is:—

1. A pneumatic tire having a central tread portion, and suitable depressions disposed on either side of the tread, said depressions having inwardly convexed bounding walls free to yield inwardly or toward the centers of the depressions with any compression of the tread.

2. A pneumatic tire having a central tread portion, and suitable depressions disposed on either side of the tread, said depressions having inwardly convexed bounding walls disposed in opposed relation, a pair of opposing walls being free to yield toward the center of its depression with any compression of the tread.

3. A pneumatic tire having a central tread portion, and suitable depressions disposed on either side of the tread, said depressions having four inwardly convexed opposing bounding walls disposed in pairs respectively and substantially parallel to the plane of rotation of the tire and transverse to said rotation plane, each wall being free to yield inwardly toward the center of the depression with any compression of the tire.

4. A pneumatic tire having a central tread portion, and suitable depressions disposed on either side of the tread, said depressions having four inwardly convexed opposing bounding walls disposed in pairs, the corners of the depressions being recessed, one pair of walls being parallel to the plane of rotation of the tire and the other pair transverse thereto, the several walls being free to yield inwardly toward the center of its depression with any compression of the tire.

5. A pneumatic tire having a tread portion, and series of pockets on opposite sides of the tread, the pockets being disposed in transverse alinement and having inwardly convexed bounding walls yielding inwardly toward the centers of the pockets with any compression of the tread.

In testimony whereof I affix my signature, in presence of two witnesses.

WILLIAM H. BURRITT.

Witnesses:
 EMIL STAREK,
 JOS. A. MICHEL.